No. 737,024.

Patented August 25, 1903.

UNITED STATES PATENT OFFICE.

LOUIS ROEHM AND PAUL WALTHER, OF CHICAGO, ILLINOIS.

COMPOSITION FOR ARTIFICIAL STONE.

SPECIFICATION forming part of Letters Patent No. 737,024, dated August 25, 1903.

Application filed February 11, 1903. Serial No. 142,941. (No specimens.)

*To all whom it may concern:*

Be it known that we, LOUIS ROEHM, residing at No. 62 West Randolph street, and PAUL WALTHER, residing at No. 406 West Chicago avenue, in the city of Chicago, county of Cook, and State of Illinois, both citizens of the United States, have invented a new and useful Composition for Pavements, Floors, Steps, and all other Purposes to which Artificial Stone Can be Applied or Used, of which the following is a specification.

The objects of our invention are to provide a composition specially adapted for paving, flooring, and other artificial-stone construction which can be, first, more economically produced than asphalt or any other material hitherto used for the same purposes; second, which exceeds all other paving and flooring compositions in strength and durability; third, which is not liable to disintegrate by exposure to extreme temperatures; fourth, that is impervious to moisture; fifth, which atmospheric heat or cold will neither soften nor harden or crack; sixth, which will not crumble or scale; seventh, which will connect with and adhere to other stone and materials, and, eighth, which can be colored, dressed, and polished.

Our invention consists in the combination, first, of a certain chemical compound formed by pressure into a solid mass; second, in the reduction of this solid compound by water to a fluid; third, the dry mixture of magnesia and sand and other materials hereinafter described, and the final mixture of this dry mixture with the chemical fluid into a plastic mass ready for immediate use.

In carrying out our invention we mix two parts, by volume, of magnesium bromid, one part of salts of sodium, one part of potassium sulfate, and from three-fourths of one part, by volume, to one and a quarter parts of muriate of aluminium all together and press it into a solid mass which may be broken up in suitable parts for handling and transportation. This mass in its solid state has an acidity of from 90° to 100°, as per the lye-gage. In this state the solid chemical compound is conveyed to the place where the pavement or other structure is to be produced. There we dissolve it in water, adding sufficient water to reduce the acidity of this fluid compound to from 26° to 30°, as per lye-gage. We then prepare a dry mixture of one part of magnesia to from two to four parts of sand. Into this dry mixture we pour our prepared fluid compound and mix it all thoroughly till we have a soft plastic mass, which we can easily spread over any surface or mold into any shape. After being spread, applied, or molded, our composition will dry in from eight to twelve hours and form an impervious stone ready for dressing or polishing or immediate use.

When we prepare our composition for pavements, the sand used is coarse gravelly sand. When prepared for stairways, window-sills, and similar structures, we use a finer sand. When prepared for floors and to be laid on wood foundations, we reduce the proportional quantity of sand one-half and add one-half sawdust to the sand, making the mixture of sawdust and sand the same—to wit, one part of magnesia with a mixture in equal proportions of from two to four parts of sand and sawdust. When our composition is prepared for particularly hard surfaces, we use iron-borings instead of sawdust, and for the finest floors, such as bowling-alleys, we add chopped paper.

The same substantial results may be obtained by slight variations in the proportions of the ingredients of our compound; but in the essential proportions required to accomplish our objects as herein set forth we have given the minimum and maximum proportions and chemical conditions of our composition.

What we claim, and desire to secure by Letters Patent, is—

1. A composition for street and other pavements, composed of the combination of a chemical fluid containing and consisting of, by volume, magnesium bromid, two parts; salts of sodium, one part; potassium sulfate, one part; muriate of aluminium from three-fourths to five-fourths ($\tfrac{3}{4}$ to $\tfrac{5}{4}$) parts reduced to a solid mass by pressure, said mass having an acidity of from 90° to 100°, as per lye-gage, and a sufficient quantity of water to dissolve this solid mass, and reduce the acidity of the resultant chemical fluid to from 26° to 30°, as per lye-gage, with a combination consisting of one part of magnesia and from two to four parts of gravelly sand, mixed together dry; this chemical fluid and mineral mixture being combined into one soft, plastic composition, substantially as described and for the purposes specified.

2. The herein-described composition of matter consisting of a fluid mixture of magnesium bromid, salts of sodium, potassium sulfate, muriate of aluminium and water, and a mixture of magnesia and fine sand, the whole formed into a soft, plastic mass, substantially as described and for the purposes specified.

3. The herein-described composition of matter consisting of a fluid mixture of magnesium bromid, salts of sodium, potassium sulfate, muriate of aluminium and water, and a mixture of magnesia, sand and sawdust, the whole united and formed into a plastic mass, substantially as described and for the purposes specified.

4. The herein-described composition of matter consisting of a fluid mixture of magnesium bromid, salts of sodium, potassium sulfate, muriate of aluminium and water, and a mixture of magnesia, sand and iron-borings, the whole united in a soft, plastic mass, substantially as described and for the purposes specified.

5. The herein-described composition of matter consisting of a fluid mixture of magnesium bromid, salts of sodium, potassium sulfate, muriate of aluminium and water, and a mixture of magnesia, sand and chopped paper, the whole united in one soft, plastic mass, substantially as described and for the purposes specified.

LOUIS ROEHM.
PAUL WALTHER.

Witnesses:
JULIUS RUBINSTEIN,
JOSEPH STAAB.